US012359652B2

(12) United States Patent
Thorsen et al.

(10) Patent No.: US 12,359,652 B2
(45) Date of Patent: Jul. 15, 2025

(54) PREDICTION AND PREVENTION OF SAFETY STOP OF A WIND TURBINE (71) Applicant: VESTAS WIND SYSTEMS A/S, Aarhus N (DK)

(72) Inventors: Morten Tim Thorsen, Tilst (DK); Casper Hillerup Lyhne, Åbyhøj (DK); Johnny Nielsen, Svenstrup J (DK); Mikkel Kåe Skovdal, Aarhus N (DK)

(73) Assignee: VESTAS WIND SYSTEMS A/S, Aarhus N (DK)

( * ) Notice: Subject to any disclaimer, the term of this patent is extended or adjusted under 35 U.S.C. 154(b) by 0 days.

(21) Appl. No.: 18/500,381

(22) Filed: Nov. 2, 2023

(65) Prior Publication Data

US 2024/0141870 A1 May 2, 2024

(30) Foreign Application Priority Data

Nov. 2, 2022 (EP) .................................. 22204990

(51) Int. Cl.
*F03D 7/04* (2006.01)
*F03D 7/02* (2006.01)

(52) U.S. Cl.
CPC ........... *F03D 7/046* (2013.01); *F03D 7/0264* (2013.01); *F05B 2270/20* (2013.01); *F05B 2270/709* (2013.01)

(58) Field of Classification Search
CPC ........ F03D 7/06; F03D 7/0264; F03D 17/006; F03D 7/045; F05B 2270/20;
(Continued)

(56) References Cited

U.S. PATENT DOCUMENTS

2018/0320658 A1* 11/2018 Herzog .................. F03D 7/045
2019/0265387 A1* 8/2019 Tyagi ........................ F03D 9/00
(Continued)

FOREIGN PATENT DOCUMENTS

EP 3702613 A1 9/2020

OTHER PUBLICATIONS

Leahy Kevin et al., "Cluster analysis of wind turbine alarms for characterising and classifying stoppages," IET Renewable Power Generation, The Institution of Engineering and Technology, vol. 12, nol. 10, Date: Jul. 30, 2018, pp. 1146-1154.
(Continued)

*Primary Examiner* — Aaron R Eastman
(74) *Attorney, Agent, or Firm* — Patterson + Sheridan, LLP (57) ABSTRACT Disclosed is a method, performed by an electronic device, for control of operation of a wind turbine. The method comprises obtaining wind turbine data indicative of one or more alerting events of the wind turbine, wherein the wind turbine data comprises warning data indicative of a warning of the wind turbine, and/or alarm data indicative of an alarm state of the wind turbine. The method comprises obtaining sensor data from a plurality of sensors of the wind turbine indicative of operating conditions associated with the wind turbine. The method comprises predicting, based on the wind turbine data and the sensor data, an upcoming safety stop by applying a machine learning model to the wind turbine data and the sensor data. The method may comprise providing, based on the predicted upcoming safety stop, control data indicative of a controlled stop or a derating to be performed by the wind turbine.

15 Claims, 3 Drawing Sheets (58) Field of Classification Search
CPC .......... F05B 2270/709; F05B 2260/821; F05B 2260/84; F05B 2270/404; G05B 13/0265; G05B 2219/2619; Y02E 10/72
See application file for complete search history.

(56) References Cited

U.S. PATENT DOCUMENTS

2022/0099532 A1\* 3/2022 Zhang .................. G05B 19/042
2024/0035445 A1\* 2/2024 Iyengar .............. G05B 23/0221

OTHER PUBLICATIONS

European Patent Office, extended European Search Report for Application 22204990.0-1002 dated Mar. 30, 2023.

\* cited by examiner

PREDICTION AND PREVENTION OF SAFETY STOP OF A WIND TURBINE

The present disclosure pertains to the field of wind turbines and related systems. The present disclosure relates to a method for control of operation of a wind turbine and related electronic device.

BACKGROUND

A wind turbine has a control and monitoring system, that is designed to optimize the operations of the wind turbine and protect it against harm. Part of the protection mechanism involves a safety stop function where the wind turbine rotor is brought to a fast stop. Safety stops are used when there is a risk of structural damage or a severe incident. The safety stop can by itself cause structural damage or at least excessive wear.

SUMMARY

There is a need for an electronic device and a method that allow prediction of an upcoming safety stop and enable a control of an operation of the wind turbine to prevent the safety stop and trigger a controlled stop or a derating of the wind turbine. Accordingly, there is a need for an electronic device and a method for control of operation of a wind turbine, which mitigate, alleviate or address the shortcomings existing and reduce the wear and the risk of structural damage of the wind turbine.

Disclosed is a method, performed by an electronic device, for control of operation of a wind turbine. The method comprises obtaining wind turbine data indicative of one or more alerting events of the wind turbine. The wind turbine data comprises warning data indicative of a warning state of the wind turbine, and/or alarm data indicative of an alarm state of the wind turbine. The method comprises obtaining sensor data from a plurality of sensors of the wind turbine indicative of operating conditions associated with the wind turbine. The method comprises predicting, based on the wind turbine data and the sensor data, an upcoming safety stop by applying a machine learning model to the wind turbine data and the sensor data. The method may comprise providing, based on the predicted upcoming safety stop, control data indicative of a controlled stop or a derating to be performed by the wind turbine.

Disclosed is an electronic device comprising a memory circuitry, a processor circuitry, and an interface, wherein the electronic device is configured to perform any of the methods according to the disclosed methods.

Disclosed is a wind turbine comprising the disclosed electronic device.

Disclosed is a computer readable storage medium storing one or more programs, the one or more programs comprising instructions, which when executed by an electronic device with a display and a touch-sensitive surface cause the electronic device to perform any of the methods disclosed herein.

It is an advantage of the present disclosure that the disclosed method, the disclosed electronic device, and the disclosed wind turbine provide a prediction of an upcoming safety stop and thereby allow prevention of the safety stop by triggering a controlled stop or derating. Safety stops require visits of an operator on site to restart the wind turbine while a controlled stop usually allows the wind turbine to be restarted automatically by a main control system itself, and if this is not the case, then restarted remotely. Preventing safety stops can lead to improved up-time of the wind turbine as resumption can be quicker. Avoiding safety stops also provides mitigation or reduction of structural damage or excessive wear of the wind turbine over time.

BRIEF DESCRIPTION OF THE DRAWINGS

The above and other features and advantages of the present disclosure will become readily apparent to those skilled in the art by the following detailed description of exemplary embodiments thereof with reference to the attached drawings, in which.

DETAILED DESCRIPTION

Various exemplary embodiments and details are described hereinafter, with reference to the figures when relevant. It should be noted that the figures may or may not be drawn to scale and that elements of similar structures or functions are represented by like reference numerals throughout the figures. It should also be noted that the FIGS. are only intended to facilitate the description of the embodiments. They are not intended as an exhaustive description of the disclosure or as a limitation on the scope of the disclosure. In addition, an illustrated embodiment needs not have all the aspects or advantages shown. An aspect or an advantage described in conjunction with a particular embodiment is not necessarily limited to that embodiment and can be practiced in any other embodiments even if not so illustrated, or if not so explicitly described.

The present disclosure provides a computer-implemented method. The method is performed for example for providing control data indicative of a controlled stop or a derating to be performed by the wind turbine, such as for control of operation of a wind turbine.

When an alerting event is detected or determined by the wind turbine, a controller may automatically take action in response to the alerting event. The controller comprises a main control system and a safety control system. The safety control system is a system implemented as the protection of the wind turbine and triggered to activate a safety stop. The main control system is configured to control operations of the wind turbine under normal conditions.

A safety stop includes for example shutdowns triggered by the safety control system, such as shutdowns initiated by an emergency stop button, an over speed supervision, etc. A safety stop for example includes shutdowns where the rotor pitch, such as the pitch of one or more rotor blades of the wind turbine, during the stopping process is handled by the safety pitch system. Such stops may be triggered by the wind turbine main controller, but the actual pitch control to stop the rotation is handled by the safety pitch system. A controlled stop is handled by the main production controller which controls pitch proportion valves for a hydraulic pitch system or electrical motors for an electrical pitch system without invoking the safety pitch system.

Part of the protection mechanism involves a safety stop function where the wind turbine rotor is brought to a fast stop, such as an emergency stop. Safety stops are used when there is a risk of structural damage or a severe incident. In general, a wind turbine can also be stopped in a controlled manner handled by the main control system. The safety stop can, unlike a controlled stop or a derating, by itself cause structural damage or at least excessive wear.

For some alerting events, it may be determined that the wind turbine cannot continue to operate in a safe or reliable manner such that the controller triggers the safety control system to activate safety stop of the wind turbine. The safety stop may be activated because the wind turbine entered an alarm state in which wind turbine operation is stopped.

After a safety stop, the wind turbine may then only be restarted when it is determined to be appropriate to do so via human input, e.g., once service personnel have performed on-site maintenance.

After a controlled stop, the turbine may restart itself, or a technician can remotely initiate resumption of wind turbine operation. Such remote control of the wind turbine may be performed from a remote control or operations centre off-site from a wind park.

The present disclosure provides methods, devices and computer programs that predict the likelihood of a safety stop being imminent so that a controlled stop or a derating can be triggered before the safety stop occurs.

Over time, the wind turbine data (such as events data and/or action log) builds up an extensive database linking sensor data to alerting events that led to safety stop for various wind turbines. The wind turbine data is extensive and complex such that it may be difficult or not possible for a human to analyse the wind turbine data properly and accurately for the purpose of predicting an upcoming safety stop. Retrospective analysis of data can allow identifying some safety stops, caused by alarms triggered and can help predict and avoid the safety stops. The wind turbine data provides e.g., logged events and warnings in the system being triggered before arriving at the alarm state and resulting in a safety stop.

The prediction is based on a machine learning model trained on the wind turbine data indicative of one or more alerting events (such as warning data and/or alarm data), thresholds, sensor data, simulation data, and/or any combination thereof. The training of the machine learning model allows identifying patterns in the wind turbine data that resulted in safety stops even before the safety stop occurs. When the trained machine learning model is deployed, the trained machine learning model continuously predicts the likelihood of a safety stop in the near future. The prediction is fed to the main control system of the wind turbine which can then activate a controlled stop or a derating of the wind turbine to prevent a safety stop.

The method comprises obtaining wind turbine data indicative of one or more alerting events of the wind turbine. An alerting event may be seen as an event that indicates a warning state of the wind turbine and/or an alarm state of the wind turbine. The wind turbine data comprises for example warning data indicative of a warning state of the wind turbine, and/or alarm data indicative of an alarm state of the wind turbine. In a warning state, the main control system can for example experience one or more warnings being generated. The warning data is for example data indicative of an observed anomalous behaviour that does not lead to safety stop. The alarm data is for example data indicative of an observed anomalous behaviour that led to safety stop.

The method comprises obtaining sensor data from a plurality of sensors of the wind turbine indicative of operating conditions associated with the wind turbine. The sensor data includes data from one or more of: an accelerometer, a thermometer, a wind sensor, a humidity sensor, a vibration sensor, a pressure sensor, a position sensor, a shock sensor, a rotor speed sensor, a load sensor, a power meter, a current meter, a LiDAR, etc. The sensors providing the sensor data may be determined to be any suitable combination of the available sensors. For example, the sensor data may include data indicative of wind speed and/or direction in the vicinity of the wind turbine, and/or a level of turbulence, ambient temperature, and/or humidity in the vicinity of the wind turbine. The sensor data may include data indicative of loads experienced by one or more rotor blades of the wind turbine, and/or data indicative of an acceleration of one or more components of the wind turbine, e.g., side-to-side acceleration of the wind turbine tower. The sensor data may include rotor speed data, shock sensor data, temperature data of turbine components, such as converter, generator, gearbox, hydraulic oil, and/or hydraulic oil pressure data.

The method comprises predicting, based on the wind turbine data and the sensor data, an upcoming safety stop by applying a machine learning model to the wind turbine data and the sensor data. In other words, the electronic device predicts and/or determines a safety stop parameter indicative of an upcoming safety stop by applying the machine learning model to the wind turbine data and the sensor data. Machine learning may involve identifying and recognizing patterns in existing data in order to facilitate making predictions for subsequent data. Models may be created based on training data in order to make as valid and reliable as possible predictions based on the wind turbine data and the sensor data obtained. For example, the machine learning model takes as input the wind turbine data and the sensor data and provides as output the prediction of the upcoming safety stop. For example, the output may include a safety stop parameter indicative of the prediction of the upcoming safety stop.

The method comprises providing, based on the predicted upcoming safety stop, control data indicative of a controlled stop or a derating to be performed by the wind turbine. A controlled stop may be seen as a stop carried by a main control system of the electronic device, such as the main control system in operations under normal conditions. A derating may be seen as a mechanism that adjusts (e.g., lowers) a power set point or speed of the wind turbine, e.g., by adjusting speed, and/or rotor pitch of the wind turbine.

For example, the electronic device provides, based on the safety stop parameter indicative of the upcoming safety stop, control data indicative of a controlled stop or a derating to be performed by the wind turbine. In one or more example methods, providing the control data comprises controlling, based on the control data, the wind turbine. In one or more example methods, providing the control data comprises transmitting the control data to a controller (e.g., an external controller and/or a central controller) causing the controlled stop or the derating of the wind turbine. In one or more example methods, the control data is provided from the electronic device (e.g., a processor thereof) to the controller (e.g., such as an internal controller) causing the controlled stop or the derating of the wind turbine.

In one or more example methods, applying the machine learning model may be seen as having a processor of the electronic device employ artificial intelligence. For example, applying the machine learning model may be seen as executing a machine learning program using the processor of the electronic device.

In one or more example methods, the machine learning model is trained based on historical data. In one or more example methods, the historical data comprises one or more of: historical wind turbine data associated with a plurality of wind turbines, and historical sensor data associated with respective wind turbines of the plurality of wind turbines. In one or more example methods, the historical wind turbine data is indicative of alerting events of respective wind turbines that led to (e.g., that were followed by, occurred before, and/or resulted in) a safety stop and/or an alarm state. In other words, the historical wind turbine data for example comprises historical warning data of one or more wind turbines that have previously experienced a safety stop (and/or an alarm state) and/or historical alarm data of one or more wind turbines that have previously experienced a safety stop and/or an alarm state. It may be envisaged that historical wind turbine data and/or historical sensor data may be collected and provided from a plurality of wind turbines of various wind parks.

In one or more example methods, the historical data is pre-processed to reduce and/or cancel noise, to normalise, and/or to sanitise the historical data for training of the machine learning model.

The historical data (e.g. including historical wind turbine data and/or historical sensor data) may be seen as training data, used by the machine learning model to establish a mapping, a relation, and/or a link between historical wind turbine data that led to a safety stop and/or an alarm state and historical sensor data indicative of operating conditions when the wind turbine has previously experienced a safety stop and/or an alarm state. In one or more example methods, the machine learning model is trained by determining, based on the historical data, one or more patterns in the historical data that led to the safety stop and/or the alarm state. For example, the one or more patterns that led to the safety stop and/or the alarm state characterize the mapping, the relation, and/or the link between historical wind turbine data that led to a safety stop and/or an alarm state and historical sensor data indicative of operating conditions when the wind turbine has previously experienced a safety stop and/or an alarm state. For example, the one or more patterns can be represented by a structure of the machine learning model (such as a breadth and/or a depth and/or a type of layers of the machine learning model, and/or a type of machine learning method (e.g. neural network, decision tree, etc.), and/or activation functions, and/or convolution kernels if any, features, and/or pre-processing methods) where one or more parameters (such as weights and/or coefficients and/or hyper parameters) of the machine learning model are found to be optimal and/or accurate and/or convergent, during training, to predict an upcoming safety stop. It may be envisaged that various types of machine learning methods may be used which have other types of parameters.

In one or more example methods, determining, based on the historical data, one or more patterns that led to the safety stop and/or the alarm state comprises determining, based on the historical data, one or more features that led to the safety stop and/or the alarm state. Features may be seen as data point combinations that led to a safety stop and/or alarm state in the historical data. A feature may be seen as a combination of data points, such as a data set, such as an ordered data set, such as a temporal sequence of data points, such as a time series of data points. For example, the input to the machine learning model can include one or more of: time series data, event data, lagged versions thereof, pre-processed versions thereof (e.g., low-pass filtered, Fourier transformed, noise-cancelled, etc.), combinations of different data sources e.g., different sensors and/or different event logs. For example, the one or more patterns characterize intrinsic information in the features based on which the trained machine learning model can predict the safety stop in real-time.

Stated differently, the training of the machine learning model allows identifying, from the historical data, situations (represented by the one or more features, and/or reflected and/or captured by the one or more patterns) that led to the safety stop and/or the alarm state. For example, the training of the machine learning model allows labelling the one or more data points of the historical data as leading to a safety stop, as part of determining the one or more features. For example, the features are learned using the labelled data points of the historical data.

In one or more example methods, determining, based on the historical data, one or more patterns that led to the safety stop and/or the alarm state comprises labelling one or more data points of the historical data with an alerting label indicative of an upcoming safety stop. For example, the historical data (which is used as training data) can be labelled and/or annotated by the electronic device to indicate data points leading to a safety stop. In other words, for example, the labelled historical data can be seen as training data for the machine learning model.

In other words, for example, the electronic device determines the one or more features (such as features of feature selection technique and/or of a feature extraction technique) based on the historical data and identifies the determined one or more features as alarming events. For example, the feature can represent a combination of one or more sensor data points (from the historical sensor data) and one or more wind turbine data points (from the historical wind turbine data) that were associated with a past safety stop. For example, the machine learning model has identified and labelled with the alerting label during training that specific sensor data from a number of specific sensors along with a number of specific alarm signals always lead to a safety stop within one minute. For example, the trained machine learning model predicts an upcoming safety stop in one minute when the patterns learned to be indicative of the safety stop start to emerge in the features (e.g., when the sensor data and wind turbine data show an occurrence of the specific sensor data from the number of specific sensors along with the number of specific alarm signals). Labelling the one or more features for example comprises augmenting a time series with a signal that indicates "time until safety stop" and use that as the label used for supervised learning.

In one or more example methods, the one or more features comprise a combination of one or more data points indicative of one or more alarms from one or more predetermined alarm categories, and one or more data points indicative of one or more warnings from one or more predetermined warning categories. For example, features can include one or more warnings and/or one or more alarms and/or other logging data. For example, the alarms and/or warnings can be logged for the wind turbine or for one or more other wind turbines of the plurality of wind turbines (e.g., from one or more wind parks). The machine learning model can identify, based on the historical data, alarm categories and warning categories that predominantly lead to a safety stop. In one or more example methods, the one or more features comprise a temporal sequence of the data points. For example, a feature include data from other wind turbines (e.g. not only the one considered for deployment). Stated differently, for example, the training of the machine learning model includes tagging and/or labelling data points of the historical data that are representative of avoidable alarms. For example, the training of the machine learning model includes tagging and/or labelling of a combination of alarm categories, with associated warnings from specified categories logged in temporal sequence from the turbine or from other turbines in the park to predict an upcoming safety stop. In some examples, the labelling and/or tagging can be performed prior to training based on known avoidable alarms. For example, the machine learning model can be trained to find patterns in the features that predict the type of events labelled in the training data as indicating safety stops.

In one or more example methods, the sensor data comprises one or more thresholds. The safety stop can be the result of predefined alarms and thresholds based on sensor data and/or computed data signal. Thresholds and levels can be the result of simulations, be site specific and possibly subject to certification. The threshold values can define when the wind turbine enters an alarm state and/or when a warning is triggered. For instance, it may be determined that the particular operating conditions (as ascertained from sensor data) which resulted in an alarm state are not in fact conditions that need wind turbine operation to cease, in which case the thresholds that define and trigger certain error states may be adjusted so that the wind turbine is shut down in future only when it actually needs to be.

In one or more examples, during training, a time parameter indicative of a time until a safety stop is determined based on the historical data. In one or more examples, the labelling may be performed by including the time parameter as the alerting label. In other words, the features of the machine learning model can be augmented by including the time parameter as the alerting label. For example, a time series includes a signal indicative of the time parameter. In other words, for example, the signal indicates "time until safety stop". The alerting label can be used for supervised learning. During inference (when the machine learning model is applied), the method, for example, outputs the time parameter which indicates a predicted time to safety stop.

For example, once the machine learning model has been trained, the machine learning model embodies one or more patterns matching a structure of the machine learning model (such as breadth and/or depth and/or type of layers) and one or more parameters of the machine learning model found to be optimal to predict an upcoming safety stop during the training of the machine learning model.

In one or more example methods, applying the machine learning model to the wind turbine data and the sensor data comprises mapping the wind turbine data and the sensor data to the one or more features. In one or more example methods, applying the machine learning model to the wind turbine data and the sensor data comprises determining, based on the mapping, one or more data sets corresponding to the one or more features. In one or more example methods, applying the machine learning model to the wind turbine data and the sensor data comprises classifying the one or more data sets as early indicators of the upcoming safety stop. In other words, the feature can be pre-processed and/or transformed to generate new features.

In one or more example methods, the machine learning model comprises a supervised machine learning model. In one or more example methods, the machine learning model may be trained using supervised machine learning. For example, the supervised machine learning model comprises one or more of: a Support-Vector Machine (SVM) model, a Bayesian model, a Decision Tree model, a Random Forest model, a linear regression, a logistic regression, and an Ensemble based model.

In one or more example methods, the machine learning model is a neural network model. For example, the machine learning model may employ the neural network, which may be a convolutional neural network, a deep learning neural network, or a combined learning module or program that learns from the historical data for predicting an upcoming safety stop in training. The trained neural network is for example then deployed to infer an upcoming safety stop using live data (e.g. sensor data and/or wind turbine data).

In supervised machine learning, the processor of the electronic device may be provided with example inputs and their associated outputs, and may seek to discover a general rule (such as a mapping, a relation) that maps inputs to outputs, so that when subsequent inputs occur in the obtained wind turbine data and sensor data, the processor of the electronic device may, based on the discovered rule, accurately predict the correct output. In unsupervised machine learning, the processor of the electronic device may be required to find its own structure in unlabelled historical data. In one or more examples, machine learning techniques may be used to extract data from the historical data.

In one or more example methods, applying the machine learning model to the wind turbine data and the sensor data comprises providing a likelihood that a safety stop is upcoming. For example, the safety stop parameter comprises a likelihood parameter indicating that a safety stop is upcoming. In one or more example methods, applying the machine learning model to the wind turbine data and the sensor data comprises determining a confidence score associated with the likelihood that a safety stop is upcoming. In one or more examples, the safety stop parameter comprises a confidence score associated with the likelihood that a safety stop is upcoming. In one or more examples, the safety stop parameter comprises the likelihood parameter and the confidence score associated with the likelihood parameter. In one or more example methods, predicting, based on the wind turbine data and the sensor data, the upcoming safety stop comprises predicting, based on the likelihood, and/or the confidence score, the upcoming safety stop. In one or more example methods, the method comprises determining whether the likelihood parameter and/or the confidence score meet a criterion (such as being above a threshold). In one or more example methods, the method comprises upon determining that the likelihood parameter and/or the confidence score meet the criterion (such as being above a threshold), determining control data indicating that a controlled stop or a derating is to be performed by the wind turbine. In one or more example methods, the method comprises upon determining that the likelihood parameter and/or the confidence score does not meet the criterion (such as being equal to or below the threshold), refraining from determining the control data indicating that a controlled stop or a derating is to be performed by the wind turbine. For example, the machine learning model can output a likelihood parameter of 0.9 and a confidence score of 0.97. For example, the likelihood parameter meets the criterion for a threshold of 0.85, and/or the confidence core meets the criterion for this threshold, the control data is determined and provided to indicate that a controlled stop or a derating is to be performed by the wind turbine.

In one or more example methods, the method comprises obtaining a feedback parameter indicative of an actual safety stop. In one or more example methods, the method comprises updating, based on the feedback parameter, the machine learning model. For example, the updating of the machine learning model based on the feedback parameter may be seen as a retraining of the machine model for the same wind turbine or based on data from neighbouring wind turbines. In one or more examples the machine learning model is updated using supervised learning. This may be performed by having periods of time where the machine learning model is applied and other periods of time where the machine learning model is not applied, and safety stop occurred which provides the feedback parameter. This may be seen as online and/or live retraining of the machine learning model.

In one or more example methods, the method comprises collecting wind turbine data and sensor data for retraining the machine learning model offline.

The figures are schematic and simplified for clarity, and they merely show details which aid understanding the disclosure, while other details have been left out. Throughout, the same reference numerals are used for identical or corresponding parts.

Figure 1:
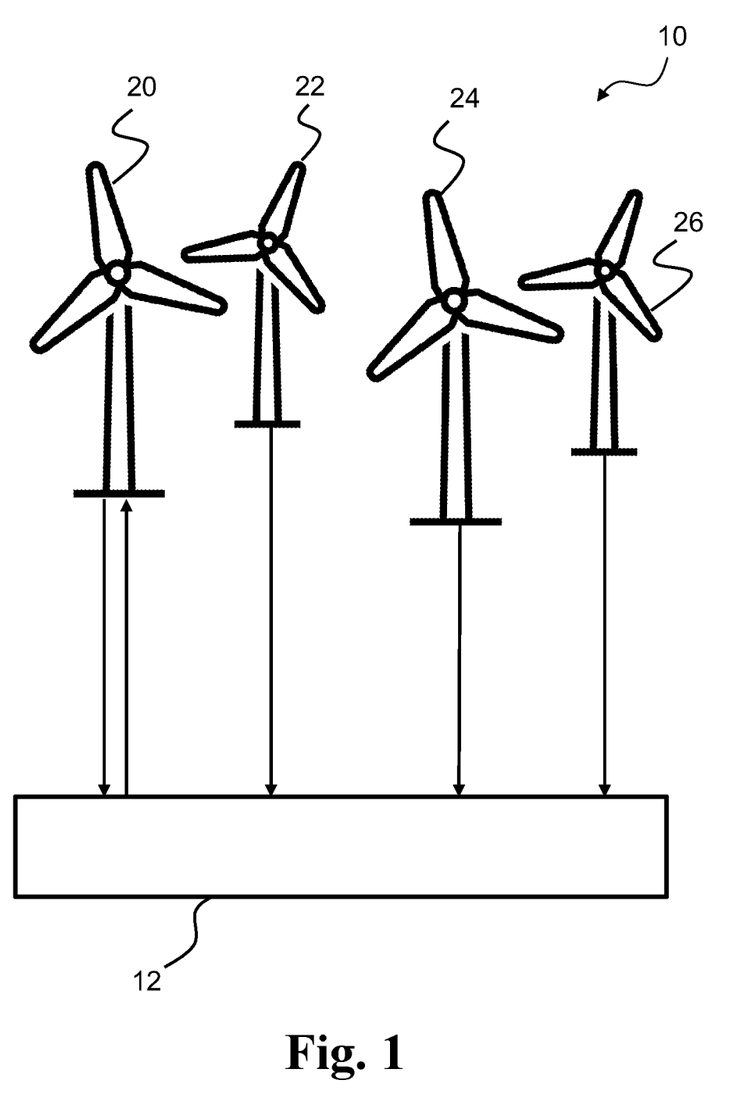
FIG. 1 is a diagram illustrating schematically a wind turbine that is part of a wind park including a plurality of wind turbines.

FIG. 1 is a diagram illustrating a wind turbine that is part of a wind park including a plurality of wind turbines.

FIG. 1 shows a wind park or wind farm 10 that includes a plurality of wind turbines.

The term "wind park" may be seen as a group of at least two wind turbines sharing infrastructure, such as infrastructure for power transmission to a power grid. In other words, the wind park comprises a plurality of wind turbines being arranged at a geographical site.

In particular, the wind park 10 includes a (first) wind turbine 20 and a number of other (or second) wind turbines 22, 24, 26 located on the site of the wind park 10 and distributed adjacently thereto. Each wind turbine 20, 22, captures energy from the wind to generate power. As is typical, each wind turbine 20, 22 will include a tower, a nacelle atop the tower housing various mechanical and electrical components, and a rotor with a plurality of rotor blades (typically three) mounted thereto.

Each wind turbine 20, 22 has a number of sensors associated therewith for measuring and monitoring various aspects related to current operating conditions of the respective wind turbine 20, 22. A modern wind turbine may have over one hundred different sensors, for measuring different factors. These typically include sensors for measuring aspects of the wind conditions in which the wind turbine is operating, the loads being experienced by different components of the wind turbine, and the movement, e.g., acceleration, of various components of the wind turbine. The data (e.g., sensor data) received from the wind turbine sensors is used to control operation of the respective wind turbine, e.g., to control the wind turbine to operate in an appropriate mode of operation, for instance to minimise component loading and/or to maximise energy production.

A wind turbine 20 may have a controller to control operation of the wind turbines based on sensor data received from the various sensors. For instance, the controller may be used to adjust a pitch angle of the rotor blades (collectively and/or individually) and/or control a speed of a generator housed in the nacelle of the turbine. The controller is arranged to receive data indicative of measurements taken by the various sensors of the wind turbine 20 over time.

Each wind turbine 20, 22, 24, 26 may have a respective controller to control operation of the wind turbines based on sensor data received from the various sensors.

The controller may form part of a wind turbine 20 or may be external to the wind turbine 20. An external controller is for example illustrated as controller 12 of FIG. 1. The external controller may be seen as a central controller configured to control operations of the wind turbines of the park. For example, the controller 12 is located at or near to the wind park 10. For example, the controller 12 is located remotely from the wind park 10, e.g., at or near to an operations centre where one or more technicians are located.

The controller 12 is arranged to receive data indicative of measurements taken by the various sensors of each wind turbine 20, 22, 24, 26 over time. This may be stored by the controller 12, or a data repository and/or memory accessible by the controller 12. In particular, the received sensor data may be stored in the form of an events log and/or database. For instance, the sensor data received from a particular wind turbine when a certain event occurred is labelled as being associated with that event, where the event may for instance be an alerting event, e.g., the wind turbine entering an alarm state in which wind turbine operation is stopped. The events log may additionally include details of what actions were taken in response to a particular recorded event, e.g., the wind turbine was restarted remotely, service personnel were dispatched to the wind turbine site, etc. In particular, these may be actions that were performed automatically by the wind turbine, or actions initiated by human interaction, e.g., a remote technician. Furthermore, the events log may include details of whether a performed action associated with a given event was successful in overcoming the problem associated with the event, e.g., whether the performed action resolved the problem such that wind turbine operation could resume, whether the same or a different error arose because of the performed action, etc.

The wind turbines will have a number of different alerting events associated with their operation. Typically, hundreds or even thousands of such alerting events may be possible for a given wind turbine. For instance, such alerting events may be a result of the failure of one or more of the wind turbine sensors, failure of a wind turbine component, excessive loading being experienced by a wind turbine component, extreme weather conditions in the vicinity of the wind turbine, etc.

When an alerting event is detected or determined by the wind turbine, a controller may automatically take action in response to the alerting event. The present disclosure provides methods, devices and computer programs that predict the likelihood of a safety stop being imminent so that a controlled stop or a derating can be triggered before the safety stop occurs. The prediction is based on a machine learning model trained on the wind turbine data indicative of one or more alerting events (such as warning data and/or alarm data), sensor data, simulation data, and/or any combination thereof. The training of the machine learning model allows identifying patterns in the wind turbine data that resulted in safety stops even before the safety stop occurs. When the trained machine learning model is deployed, the trained machine learning model can (e.g., continuously) predict the likelihood of a safety stop in the near future. The prediction is fed to the main control system of the wind turbine which can then activate a controlled stop or a derating of the wind turbine to prevent a safety stop.

Figure 2:
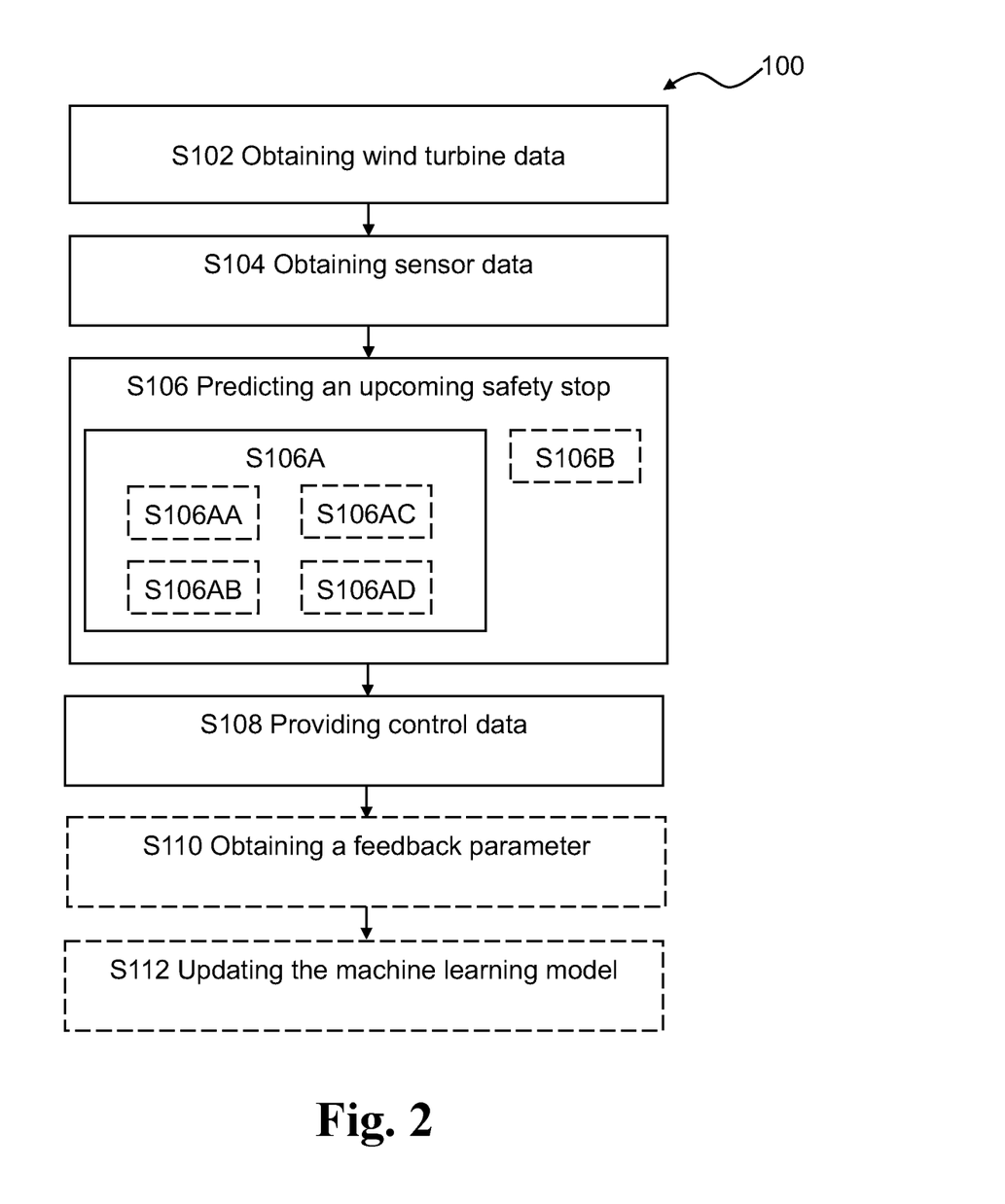
FIG. 2 is a flow-chart illustrating an exemplary method, performed by an electronic device, for controlling an operation of a wind turbine according to this disclosure.

FIG. 2 shows a flow diagram of an example method 100, performed by an electronic device according to the disclosure. The electronic device is the electronic device disclosed herein, such as a controller disclosed herein, such as a controller of the wind turbine or an external controller 12 of FIG. 1.

The method 100 is performed for example for providing control data indicative of a controlled stop or a derating to be performed by the wind turbine, such as for control of operation of a wind turbine.

The method comprises obtaining S102 wind turbine data indicative of one or more alerting events of the wind turbine. In one or more example methods, the wind turbine data comprises warning data indicative of a warning state of the wind turbine, and/or alarm data indicative of an alarm state of the wind turbine. The wind turbine data can indicate for example that the wind turbine has certain parts of the wind turbine operation—such as the operation of certain components—not functioning as expected. The wind turbine data may be obtained substantially continuously and/or periodically. The wind turbine data may be obtained upon occurrence of an alerting event. In one or more example methods, obtaining S102 wind turbine data indicative of one or more alerting events of the wind turbine comprises receiving and/or retrieving the wind turbine data from a memory of electronic device and/or from the wind turbine.

The method 100 comprises obtaining S104 sensor data from a plurality of sensors of the wind turbine indicative of operating conditions associated with the wind turbine. The sensor data may be received substantially continuously or periodically by the electronic device, and not just when alerting events are triggered. In one or more example methods, obtaining S104 sensor data comprises receiving and/or retrieving the wind turbine data from a memory of electronic device and/or from the wind turbine. In one or more example methods, the sensor data comprises one or more thresholds. The safety stop can be the result of predefined alarms and thresholds based on sensor data and/or computed data signal. Thresholds and levels can be the result of simulations, be site specific and possibly subject to certification. The threshold values can define when the wind turbine enters an alarm state and/or when a warning is triggered. For instance, it may be determined that the particular operating conditions (as ascertained from sensor data) which resulted in an alarm state are not in fact conditions that need wind turbine operation to cease, in which case the thresholds that define and trigger certain error states may be adjusted so that the wind turbine is shut down in future only when it actually needs to be.

The method 100 comprises predicting S106, based on the wind turbine data and the sensor data, an upcoming safety stop by applying S106A a machine learning model to the wind turbine data and the sensor data. In one or more example methods, predicting S106, based on the wind turbine data and the sensor data, the upcoming safety stop comprises predicting and/or determining a safety stop parameter indicative of the upcoming safety stop by applying the machine learning model to the wind turbine data and the sensor data. For example, the predicted upcoming safety stop is an upcoming and avoidable emergency stop. For example, the machine learning model applied in S106A takes as input the wind turbine data and the sensor data and provides as output the prediction of the upcoming safety stop. For example, the output may include a safety stop parameter indicative of the prediction of the upcoming safety stop.

The method 100 comprises providing S108, based on the predicted upcoming safety stop, control data indicative of a controlled stop or a derating to be performed by the wind turbine. A controlled stop may be seen as a stop carried by a main control system of the electronic device, such as the main control system in operations under normal conditions. A derating may be seen as a mechanism that adjusts (e.g., lowers) a power set point or speed of the wind turbine, e.g., by adjusting speed, and/or rotor pitch of the wind turbine.

In one or more example methods, providing S108 the control data comprises controlling, based on the control data, the wind turbine. In one or more example methods, providing S108 the control data comprises transmitting the control data to a controller (e.g., an external controller and/or a central controller) causing the controlled stop or the derating of the wind turbine. In one or more example methods, the control data is provided from the electronic device (e.g., a processor thereof) to the controller (e.g., such as an internal controller) causing the controlled stop or the derating of the wind turbine.

In one or more example methods, the machine learning model is trained based on historical data. In one or more example methods, the historical data comprises one or more of: historical wind turbine data associated with a plurality of wind turbines, and historical sensor data associated with respective wind turbines of the plurality. In one or more example methods, the historical wind turbine data is indicative of alerting events of respective wind turbines that led to a safety stop and/or an alarm state. The historical data (e.g. including historical wind turbine data and/or historical sensor data may be seen as training data, used by the machine learning model to establish a mapping, a relation, and/or a link between historical wind turbine data that led to a safety stop and/or an alarm state and historical sensor data indicative of operating conditions when the wind turbine has previously experienced a safety stop and/or an alarm state. The trained ML model may be stored in a memory and retrieved by electronic device to be applied at step S106A.

In one or more example methods, the machine learning model is trained by determining, based on the historical data, one or more patterns that led to the safety stop and/or the alarm state. For example, the one or more patterns can be represented by a structure of the machine learning model (such as a breadth and/or a depth and/or a type of layers of the machine learning model) and one or more parameters (such as weights and/or coefficients) of the machine learning model found to be optimal and/or accurate and/or convergent, during training, to predict an upcoming safety stop.

In one or more example methods, determining, based on the historical data, one or more patterns that led to the safety stop and/or the alarm state comprises determining, based on the historical data, one or more features that led to the safety stop and/or the alarm state. In one or more example methods, determining, based on the historical data, one or more patterns that led to the safety stop and/or the alarm state comprises labelling the one or more data points of the historical data with an alerting label indicative of an upcoming safety stop. A feature may be seen as a combination of data points, such as a data set, such as an ordered data set, such as a temporal sequence of data points, such as a time series of data points. Stated differently, the training of the machine learning model allows identifying, from the historical data, the one or more features that led to the safety stop and/or the alarm state and labelling the one or more data points of the historical data as leading to a safety stop.

In one or more example methods, the one or more features comprise a combination of one or more data points indicative of one or more alarms from one or more predetermined alarm categories, and one or more data points indicative of one or more warnings from one or more predetermined warning categories. For example, the one or more data points are indicative of one or more alarms and/or warnings logged for the wind turbine and/or for one or more other wind turbines of the wind park. In one or more example methods, the one or more features comprise a temporal sequence of the data points. A temporal sequence may be seen as a time series comprising a plurality of data points ordered in time.

In one or more example methods, applying S106A the machine learning model to the wind turbine data and the sensor data comprises mapping S106AA the wind turbine data and the sensor data to the one or more features. In one or more example methods, applying S106A the machine learning model to the wind turbine data and the sensor data comprises determining S106AB, based on the mapping, one or more data sets corresponding to the one or more features. In one or more example methods, applying S106A the machine learning model to the wind turbine data and the sensor data comprises classifying S106AC the one or more data sets as early indicators of the upcoming safety stop. In one or more example methods, the one or more data sets classified as early indicators of the upcoming safety stop are used to generate the control data indicative of a controlled stop or a derating to be performed by the wind turbine, causing the electronic device to activate the controlled stop and/or the derating of the wind turbine. In one or more examples, during training, a time parameter indicative of a time until a safety stop is determined based on the historical data. In one or more examples, the training can comprise including the time parameter as part of the one or more features. In other words, the features can be augmented by including the time parameter as the alerting label. During inference (when the machine learning model is applied), the one or more data sets classified as early indicators of the upcoming safety stop are used to output the time parameter which indicates a predicted time to safety stop.

In one or more example methods, the machine learning model comprises a supervised machine learning model. In one or more example methods, the machine learning model may be trained using supervised machine learning. For example, the supervised machine learning model comprises one or more of: a Support-Vector Machine (SVM) model, a Bayesian model, a Decision Tree model, a Random Forest model, a linear regression, a logistic regression, and an Ensemble based model.

In one or more example methods, the machine learning model is a neural network model. In one or more example methods, the method comprises training the machine learning model by adjusting one or more weights or other parameters of a mapping function of the neural network model based on the historical data.

In one or more example methods, applying S106A the machine learning model to the wind turbine data and the sensor data comprises providing S106AD a likelihood that a safety stop is upcoming, and/or a confidence score associated with the likelihood that a safety stop is upcoming. In one or more example methods, predicting S106, based on the wind turbine data and the sensor data, the upcoming safety stop comprises predicting S106B, based on the likelihood, and/or the confidence score, the upcoming safety stop. In one or more example methods, predicting, based on the wind turbine data and the sensor data, the upcoming safety stop comprises predicting, based on the likelihood, and/or the confidence score, the upcoming safety stop. In one or more example methods, predicting, based on the wind turbine data and the sensor data, the upcoming safety stop comprises predicting, based on a comparison of the likelihood, and/or the confidence score with a criterion (such as a threshold), the upcoming safety stop a criterion.

In one or more example methods, the method comprises obtaining S110 a feedback parameter indicative of an actual safety stop. In one or more example methods, the method comprises updating S112, based on the feedback parameter, the machine learning model. For example, the feedback parameter can be obtained for the same wind turbine based on on-off periods of activation of the prediction of the upcoming safety stop. For example, during the off periods, no prediction is performed, and the feedback parameter reflecting actual safety stops can help retrain the machine learning model.

Figure 3:
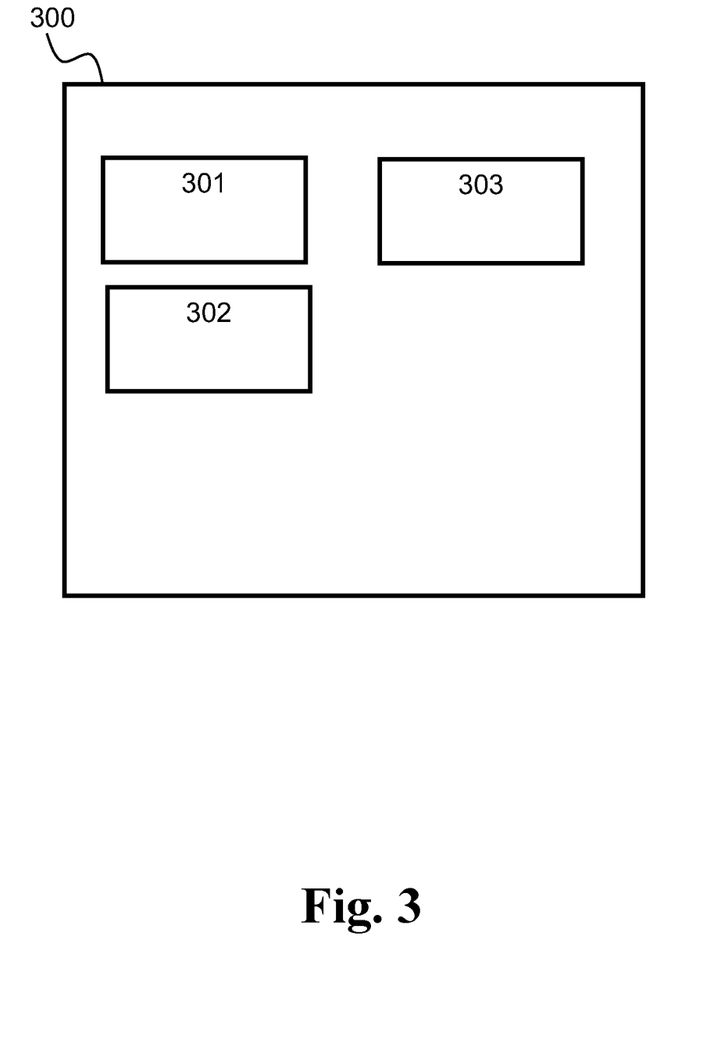
FIG. 3 is a block diagram illustrating an exemplary electronic device according to this disclosure.

FIG. 3 shows a block diagram of an example electronic device 300 according to the disclosure. The electronic device 300 comprises memory circuitry 301, processor circuitry 302 and an interface 303. The electronic device may be configured to perform any of the methods disclosed in FIG. 2. The electronic device may be configured for controlling an operation of a wind turbine.

The electronic device is configured to obtain (e.g., via processor circuitry 302 and/or interface 303) wind turbine data indicative of one or more alerting events of the wind turbine. The wind turbine data comprises warning data indicative of a warning state of the wind turbine, and/or alarm data indicative of an alarm state of the wind turbine.

The electronic device is configured to obtain (e.g., via processor circuitry 302 and/or interface 303) sensor data from a plurality of sensors of the wind turbine indicative of operating conditions associated with the wind turbine.

The electronic device is configured to predict (e.g., via processor circuitry 302) based on the wind turbine data and the sensor data, an upcoming safety stop by applying a machine learning model to the wind turbine data and the sensor data.

The electronic device is configured to provide (e.g., via processor circuitry 302 and/or interface 303) based on the predicted upcoming safety stop, control data indicative of a controlled stop or a derating to be performed by the wind turbine.

The processor circuitry 302 is optionally configured to perform any of the operations disclosed in FIG. 2 (such as any one or more of: S102, S104, S106, S106A, S106AA, S106AB, S106AC, S106AD, S106B, S108, S110, S112). The operations of the electronic device 300 may be embodied in the form of executable logic routines (e.g., lines of code, software programs, etc.) that are stored on a non-transitory computer readable medium (e.g., the memory circuitry 301) and are executed by the processor circuitry 302).

Furthermore, the operations of the electronic device 300 may be considered a method that the electronic device 300 is configured to carry out. Also, while the described functions and operations may be implemented in software, such functionality may as well be carried out via dedicated hardware or firmware, or some combination of hardware, firmware and/or software.

The memory circuitry 301 may be one or more of a buffer, a flash memory, a hard drive, a removable media, a volatile memory, a non-volatile memory, a random access memory (RAM), or other suitable device. In a typical arrangement, the memory circuitry 301 may include a non-volatile memory for long term data storage and a volatile memory that functions as system memory for the processor circuitry 302. The memory circuitry 301 may exchange data with the processor circuitry 302 over a data bus. Control lines and an address bus between the memory circuitry 301 and the processor circuitry 302 also may be present (not shown in FIG. 3). The memory circuitry 301 is considered a non-transitory computer readable medium.

The memory circuitry 301 may be configured to store wind turbine data, sensor data, prediction data, safety stop parameters and/or control data in a part of the memory.

Disclosed is a wind turbine comprising the electronic device, such as electronic device 300 of FIG. 3.

It may be appreciated that FIGS. 1-3 comprises some circuitries or operations which are illustrated with a solid line and some circuitries or operations which are illustrated with a dashed line. The circuitries or operations which are comprised in a solid line are circuitries or operations which are comprised in the broadest example embodiment. The circuitries or operations which are comprised in a dashed line are example embodiments which may be comprised in, or a part of, or are further circuitries or operations which may be taken in addition to the circuitries or operations of the solid line example embodiments. It should be appreciated that these operations need not be performed in order presented. Furthermore, it should be appreciated that not all of the operations need to be performed. The exemplary operations may be performed in any order and in any combination.

It should further be noted that any reference signs do not limit the scope of the claims, that the exemplary embodiments may be implemented at least in part by means of both hardware and software, and that several "means", "units" or "devices" may be represented by the same item of hardware.

The various exemplary methods, devices, nodes and systems described herein are described in the general context of method steps or processes, which may be implemented in one aspect by a computer program product, embodied in a computer-readable medium, including computer-executable instructions, such as program code, executed by computers in networked environments. A computer-readable medium may include removable and non-removable storage devices including, but not limited to, Read Only Memory (ROM), Random Access Memory (RAM), compact discs (CDs), digital versatile discs (DVD), etc. Generally, program circuitries may include routines, programs, objects, components, data structures, etc. that perform specified tasks or implement specific abstract data types. Computer-executable instructions, associated data structures, and program circuitries represent examples of program code for executing steps of the methods disclosed herein. The particular sequence of such executable instructions or associated data structures represents examples of corresponding acts for implementing the functions described in such steps or processes.

Although features have been shown and described, it will be understood that they are not intended to limit the claimed disclosure, and it will be made obvious to those skilled in the art that various changes and modifications may be made without departing from the scope of the claimed disclosure. The specification and drawings are, accordingly, to be regarded in an illustrative rather than restrictive sense. The claimed disclosure is intended to cover all alternatives, modifications, and equivalents.

The invention claimed is:

1. A method, performed by an electronic device, for control of operation of a wind turbine, the method comprising:
obtaining wind turbine data indicative of one or more alerting events of the wind turbine, wherein the wind turbine data comprises warning data indicative of a warning state of the wind turbine, and/or alarm data indicative of an alarm state of the wind turbine;
obtaining sensor data from a plurality of sensors of the wind turbine indicative of operating conditions associated with the wind turbine;
predicting, based on the wind turbine data and the sensor data, an upcoming safety stop by applying a machine learning model to the wind turbine data and the sensor data, wherein the safety stop is used when there is structural damage, a risk of structural damage, or a component failure; and
providing, based on the predicted upcoming safety stop, control data indicative of a controlled stop or a derating to be performed by the wind turbine.

2. The method according to claim 1, wherein the machine learning model is trained based on historical data, wherein the historical data comprises one or more of: historical wind turbine data associated with a plurality of wind turbines, and historical sensor data associated with respective wind turbines of the plurality, wherein the historical wind turbine data is indicative of alerting events of respective wind turbines that led to a safety stop and/or an alarm state.

3. The method according to claim 2, wherein the machine learning model is trained by determining, based on the historical data, one or more patterns in the historical data that led to the safety stop and/or the alarm state.

4. The method according to claim 3, wherein determining, based on the historical data, one or more patterns that led to the safety stop and/or the alarm state comprises:
determining, based on the historical data, one or more features that led to the safety stop and/or the alarm state; and
labelling one or more data points of the historical data with an alerting label indicative of an upcoming safety stop.

5. The method according to claim 4, wherein the one or more features comprise a combination of one or more data points indicative of one or more alarms from one or more predetermined alarm categories, and one or more data points indicative of one or more warnings from one or more predetermined warning categories.

6. The method according to claim 4, wherein the one or more features comprise a temporal sequence of the data points.

7. The method according to claim 4, wherein applying the machine learning model to the wind turbine data and the sensor data comprises:
mapping the wind turbine data and the sensor data to the one or more features;
determining, based on the mapping, one or more data sets corresponding to the one or more features; and
classifying the one or more data sets as early indicators of the upcoming safety stop.

8. The method according to claim 1, wherein the machine learning model comprises a supervised machine learning model.

9. The method according to claim 1, wherein the machine learning model is a neural network model, and wherein the method comprises training the machine learning model by adjusting one or more weights or other parameters of a mapping function of the neural network model based on historical data.

10. The method according to claim 1, wherein applying the machine learning model to the wind turbine data and the sensor data comprises providing a likelihood that a safety stop is upcoming, and/or a confidence score associated with the likelihood that a safety stop is upcoming; and wherein predicting, based on the wind turbine data and the sensor data, the upcoming safety stop comprises predicting, based on the likelihood, and/or the confidence score, the upcoming safety stop.

11. The method according to claim 1, the method comprising:
obtaining a feedback parameter indicative of an actual safety stop; and
updating, based on the feedback parameter, the machine learning model.

12. The method according to claim 1, wherein the sensor data comprises one or more thresholds.

13. An electronic device comprising a memory circuitry, a processor circuitry, and an interface, wherein the electronic device is configured to control an operation of a wind turbine, the operation comprising:
- obtaining wind turbine data indicative of one or more alerting events of the wind turbine, wherein the wind turbine data comprises warning data indicative of a warning state of the wind turbine, and/or alarm data indicative of an alarm state of the wind turbine;
- obtaining sensor data from a plurality of sensors of the wind turbine indicative of operating conditions associated with the wind turbine;
- predicting, based on the wind turbine data and the sensor data, an upcoming safety stop by applying a machine learning model to the wind turbine data and the sensor data, wherein the safety stop is used when there is structural damage, a risk of structural damage, or a component failure; and
- providing, based on the predicted upcoming safety stop, control data indicative of a controlled stop or a derating to be performed by the wind turbine.

14. A wind turbine, comprising:
- a tower;
- a nacelle disposed on the tower;
- a rotor extending from the nacelle and carrying a plurality of blades at one end thereof; and
- an electronic device comprising a memory circuitry, a processor circuitry, and an interface, wherein the electronic device is configured to perform an operation, comprising:
- obtaining wind turbine data indicative of one or more alerting events of the wind turbine, wherein the wind turbine data comprises warning data indicative of a warning state of the wind turbine, and/or alarm data indicative of an alarm state of the wind turbine;
- obtaining sensor data from a plurality of sensors of the wind turbine indicative of operating conditions associated with the wind turbine;
- predicting, based on the wind turbine data and the sensor data, an upcoming safety stop by applying a machine learning model to the wind turbine data and the sensor data, wherein the safety stop is used when there is structural damage, a risk of structural damage, or a component failure; and
- providing, based on the predicted upcoming safety stop, control data indicative of a controlled stop or a derating to be performed by the wind turbine.

15. A computer readable storage medium storing one or more programs, the one or more programs comprising instructions, which when executed on any combination of one or more processors perform an operation controlling a wind turbine, the operation comprising:
- obtaining wind turbine data indicative of one or more alerting events of the wind turbine, wherein the wind turbine data comprises warning data indicative of a warning state of the wind turbine, and/or alarm data indicative of an alarm state of the wind turbine;
- obtaining sensor data from a plurality of sensors of the wind turbine indicative of operating conditions associated with the wind turbine;
- predicting, based on the wind turbine data and the sensor data, an upcoming safety stop by applying a machine learning model to the wind turbine data and the sensor data, wherein the safety stop is used when there is structural damage, a risk of structural damage, or a component failure; and
- providing, based on the predicted upcoming safety stop, control data indicative of a controlled stop or a derating to be performed by the wind turbine.

* * * * *